United States Patent
Kosai et al.

(10) Patent No.: US 11,081,714 B2
(45) Date of Patent: Aug. 3, 2021

(54) AGING METHOD OF FUEL CELL

(71) Applicant: TOYOTA JIDOSHA KABUSHIKI KAISHA, Toyota (JP)

(72) Inventors: Masahito Kosai, Toyota (JP); Kensaku Kodama, Nagakute (JP); Shuji Kajiya, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 116 days.

(21) Appl. No.: 16/554,993

(22) Filed: Aug. 29, 2019

(65) Prior Publication Data

US 2020/0099071 A1 Mar. 26, 2020

(30) Foreign Application Priority Data

Sep. 21, 2018 (JP) .............................. JP2018-177529

(51) Int. Cl.
*H01M 8/04858* (2016.01)
*H01M 8/04223* (2016.01)
*H01M 8/1018* (2016.01)

(52) U.S. Cl.
CPC ... *H01M 8/04873* (2013.01); *H01M 8/04223* (2013.01); *H01M 2008/1095* (2013.01)

(58) Field of Classification Search
None
See application file for complete search history.

(56) References Cited

U.S. PATENT DOCUMENTS

2011/0008686 A1* 1/2011 Gould ............... H01M 8/04544
429/400
2018/0083299 A1 3/2018 Mei et al.

FOREIGN PATENT DOCUMENTS

| JP | 2010192221 A | 9/2010 |
| JP | 2016066407 A | 4/2016 |
| JP | 2018049761 A | 3/2018 |

OTHER PUBLICATIONS https://scied.ucar.edu/carbon-monoxide—UCAR Center for Science Education Carbon Monoxide (Year: 2017).*

* cited by examiner

*Primary Examiner* — Eugenia Wang
(74) *Attorney, Agent, or Firm* — Dickinson Wright PLLC

(57) ABSTRACT

The present disclosure provides a method of shortening an aging period of a polymer electrolyte fuel cell immediately after production to increase shipping inspection speed and production speed of the polymer electrolyte fuel cell. The present disclosure relates to an aging method of a fuel cell which comprises a membrane electrode assembly comprising a fuel electrode, an electrolyte membrane, and an oxidant electrode, wherein the method comprises applying a potential cycle, wherein the lowest cell potential when a load is applied and OCV are alternately repeated between the fuel electrode and the oxidant electrode, and in the potential cycle, fuel gas is supplied to the fuel electrode, and oxidant gas and carbon monoxide gas are supplied to the oxidant electrode.

8 Claims, 6 Drawing Sheets

AGING METHOD OF FUEL CELL

CROSS REFERENCE TO RELATED APPLICATIONS

The present application claims priority from Japanese patent application JP 2018-177529 filed on Sep. 21, 2018, the content of which is hereby incorporated by reference into this application.

BACKGROUND

Technical Field

The present disclosure relates to an aging method of a fuel cell. More particularly, the present disclosure relates to an aging method of a polymer electrolyte fuel cell immediately after production.

Description of Related Art

As a fuel cell that generates electricity by an electrochemical reaction between fuel gas and oxidant gas, a polymer electrolyte fuel cell has drawn attention as an energy source. In general, a membrane electrode assembly comprising electrodes composed of catalyst layers (i.e., a fuel electrode and an oxidant electrode (an air electrode)) conjugated to each of the both surfaces of a solid polymer electrolyte which is an electrolyte membrane (i.e., a fuel electrode—a solid polymer electrolyte membrane—an oxidant electrode; also referred to as "MEA") is used for a polymer electrolyte fuel cell. In addition, gas diffusion layers are occasionally conjugated to the both surfaces of a MEA. Further, separators equipped with gas flow channels are provided on the both surfaces of a MEA. In general, a polymer electrolyte fuel cell has a structure, wherein a plurality of single unit cells each comprising such MEA and separators are stacked on top of each other (i.e., a fuel cell stack).

As a method of fuel cell operation exhibiting high power-generating properties, for example, JP 2018-49761 A discloses a method of fuel cell operation comprising a step of operation, in which a power source connected to a fuel electrode and an oxidant electrode of a membrane electrode assembly comprising the fuel electrode, an electrolyte membrane, and the oxidant electrode are used to apply a voltage that undergoes a potential cycle wherein a low potential and a high potential are alternately repeated, and the low potential applied to the oxidant electrode is 0.85 V or lower with reference to a fuel electrode potential, and the high potential applied to the oxidant electrode is 1.10 V or higher with reference to the fuel electrode potential.

When a fuel cell has been used for a long period of time, performance thereof is gradually deteriorated. For example, JP 2016-66407 A discloses a method of restoring fuel cell performance for restoring the fuel cell performance without elevating an oxidant electrode potential to higher than a spontaneous potential level comprising: a step (a) of supplying carbon monoxide gas and hydrous gas (gas containing moisture) to either a fuel electrode or an oxidant electrode and supplying hydrogen gas to the other electrode while blocking oxygen supply into a fuel cell; and a step (b) of terminating the carbon monoxide gas supply and elevating a potential of the electrode to which the carbon monoxide gas has been supplied up to the specified potential whose upper limit is an open circuit potential.

Such fuel cells are known to be incapable of achieving performance as designed because of factors other than manufacturing failure, such as a lack of moisture content in an electrolyte membrane and/or an electrolyte in a catalyst layer, and adsorption of toxic substances to catalyst surfaces, which may occur immediately after production. Accordingly, fuel cells immediately after production are subjected to aging (also referred to as, for example, "break-in," "conditioning," or "activation") before shipping inspection.

For example, JP 2010-192221 A discloses a conditioning method of a fuel cell for improving an output potential of the fuel cell comprising: a step of voltage regulation repeating oxidation and reduction of catalysts in electrodes by changing an interelectrode voltage between a high potential of 900 mV to 1300 mV and a low potential of 0 mV to 700 mV in the fuel cell; and a step of temperature/humidity regulation for enhancing specific activity of the catalysts by regulating temperature of the fuel cell and humidity of gas in the fuel cell during the step of voltage regulation.

SUMMARY

FIG. 1 schematically shows a platinum (Pt) catalyst in an electrode of a fuel cell immediately after production. FIG. 1 demonstrates that a toxic substance, such as a substance comprising carbon, hydrogen, and oxygen ($C_xH_yO_z$, wherein x, y, and z are each an arbitrary number), is adhered to the Pt catalyst of the fuel cell immediately after production. A toxic substance adversely affects fuel cell performance. Accordingly, a fuel cell immediately after production is subjected to aging aimed at removal of such toxic substance.

FIG. 2 shows a correlation between an aging period and a cell voltage according to an embodiment of a step of aging and a step of cell power generation inspection of a fuel cell according to a conventional technique. While an ideal aging period up to the initiation of a step of shipping inspection of mass-produced fuel cells is approximately 30 minutes, as is apparent from FIG. 2, an aging period is as long as approximately 40 minutes in the aging method according to the conventional technique.

Therefore, a conventional aging method may not increase production speed of a fuel cell because of a long aging period.

Accordingly, the present disclosure provides a method of shortening an aging period of a polymer electrolyte fuel cell immediately after production to increase shipping inspection speed and production speed of the polymer electrolyte fuel cell.

Accordingly, as a result of intensive studies, the present inventors have discovered the following. That is, in an aging method of a fuel cell which comprises a membrane electrode assembly comprising a fuel electrode, an electrolyte membrane, and an oxidant electrode, a gas mixture blending oxidant gas with carbon monoxide (CO) gas may be supplied to the oxidant electrode in a potential cycle wherein the lowest cell potential when a load is applied and OCV (open circuit voltage) are alternately repeated between the fuel electrode and the oxidant electrode, so that an aging period of a polymer electrolyte fuel cell could be shortened. This has led to the completion of the present disclosure.

For example, exemplary embodiments are as follows.
(1) An aging method of a fuel cell which comprises a membrane electrode assembly comprising a fuel electrode, an electrolyte membrane, and an oxidant electrode, wherein the method comprises applying a potential cycle, wherein the lowest cell potential when a load is applied and OCV are alternately repeated between the fuel electrode and the oxidant electrode, and in the potential cycle, fuel gas is supplied to the fuel electrode and oxidant gas and carbon monoxide gas are supplied to the oxidant electrode.

(2) The method according to (1), wherein oxidant gas and carbon monoxide gas are supplied to the oxidant electrode when the load is applied in the potential cycle and oxidant gas is supplied to the oxidant electrode when the application of the load is terminated in the potential cycle.

(3) The method according to (1), wherein nitrogen gas is further supplied to the oxidant electrode, a cell temperature of the fuel cell is 70° C. to 90° C., the lowest cell potential when the load is applied is −0.1 V to 0.4 V, OCV is 0.8 V to 1.1 V, and potential displacement speed from the lowest cell potential when the load is applied to OCV and potential displacement speed from OCV to the lowest cell potential when the load is applied are each 0.4 V/sec to 1.0 V/sec.

(4) The method according to (2), wherein nitrogen gas is further supplied to the oxidant electrode, a cell temperature of the fuel cell is 70° C. to 90° C., the lowest cell potential when the load is applied is −0.1 V to 0.4 V, OCV is 0.8 V to 1.1 V, and potential displacement speed from the lowest cell potential when the load is applied to OCV and potential displacement speed from OCV to the lowest cell potential when the load is applied are each 0.4 V/sec to 1.0 V/sec.

(5) The method according to (1), wherein carbon monoxide gas is supplied in an amount of 2 vol % (% by volume) to 4 vol % relative to volume of entire gas supplied to the oxidant electrode.

(6) The method according to (2), wherein carbon monoxide gas is supplied in an amount of 2 vol % (% by volume) to 4 vol % relative to volume of entire gas supplied to the oxidant electrode.

(7) The method according to (3), wherein carbon monoxide gas is supplied in an amount of 2 vol % (% by volume) to 4 vol % relative to volume of entire gas supplied to the oxidant electrode.

(8) The method according to (4), wherein carbon monoxide gas is supplied in an amount of 2 vol % (% by volume) to 4 vol % relative to volume of entire gas supplied to the oxidant electrode.

EFFECT

According to the present disclosure, an aging period of a polymer electrolyte fuel cell immediately after production can be shortened, and shipping inspection speed and production speed of the fuel cell can be increased as a consequence.

DETAILED DESCRIPTION OF THE EMBODIMENTS

Figure 1:
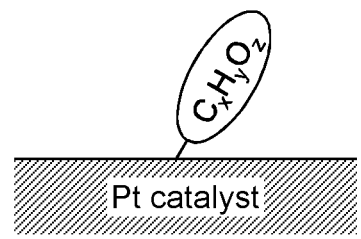
FIG. 1 schematically shows a platinum (Pt) catalyst in an electrode of a fuel cell immediately after production.
Figure 2:
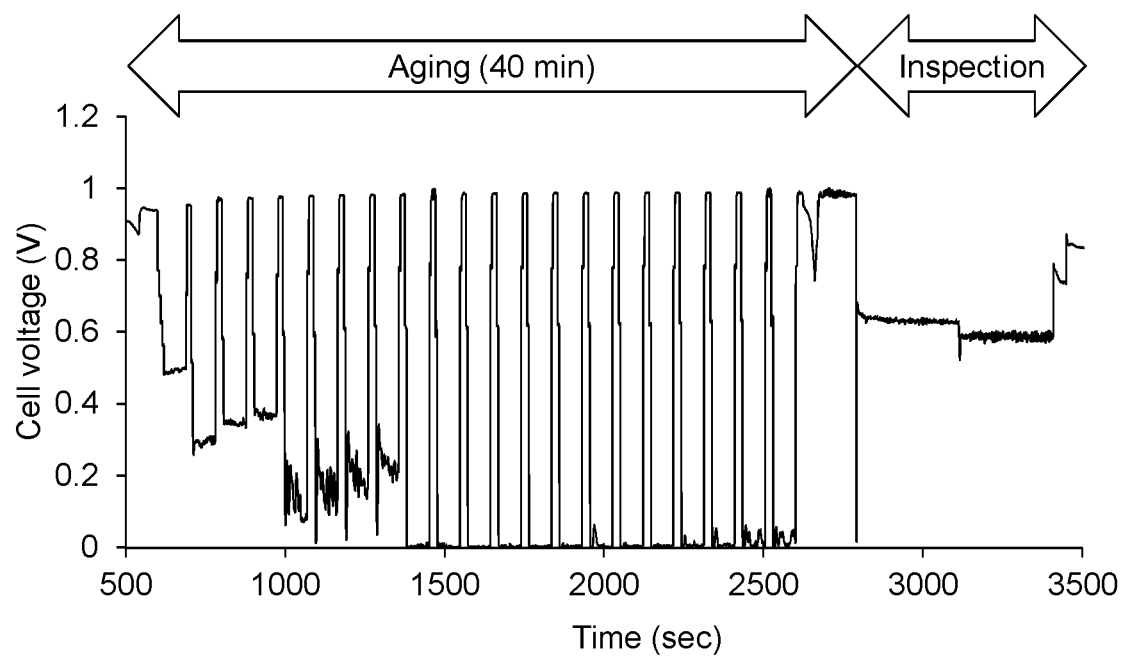
FIG. 2 shows a correlation between an aging period and a cell voltage according to an embodiment of a step of aging and a step of cell power generation inspection of a fuel cell according to a conventional technique.

Hereafter, embodiments of the present disclosure are described in detail.

The features of the present disclosure are described with reference to adequate figures herein. In the figures, a dimension and a configuration of each component are exaggerated for clarification, and an actual dimension or configuration is not accurately demonstrated. Accordingly, the technical scope of the present disclosure is not limited to the dimension and the configuration of each component demonstrated in the figures. It should be noted that the aging method of a fuel cell according to the present disclosure is not limited to the embodiments described below and a person skilled in the art is capable of achieving various types of modification and improvement within the scope of the present disclosure.

The present disclosure relates to an aging method of a fuel cell which comprises a membrane electrode assembly comprising a fuel electrode, an electrolyte membrane, and an oxidant electrode, wherein the method comprises applying a potential cycle, wherein the lowest cell potential when a load is applied and OCV (open circuit voltage) are alternately repeated between the fuel electrode and the oxidant electrode, and in the potential cycle, fuel gas is supplied to the fuel electrode and oxidant gas and carbon monoxide (CO) gas are supplied to the oxidant electrode.

(Fuel Cell)

As a fuel cell subjected to aging by a method of the present disclosure, a polymer electrolyte fuel cell known in the art can be used, and such polymer electrolyte fuel cell may be immediately after production. In general, a fuel cell subjected to aging by a method of the present disclosure has a structure, wherein a plurality of single unit cells each comprising a membrane electrode assembly (MEA) and separators are stacked on top of each other.

MEA comprises a fuel electrode, an oxidant electrode, and an electrolyte membrane provided therebetween. In addition, MEA may comprise a layer for diffusing fuel gas conjugated to the fuel electrode (i.e., a fuel gas diffusion layer) and a layer for diffusing oxidant gas conjugated to the oxidant electrode (i.e., an oxidant gas diffusion layer).

A fuel electrode and an oxidant electrode are each formed by a catalyst layer. A catalyst layer comprises a catalyst and an electrolyte.

As a catalyst, a metal-carrying catalyst may be used. In a metal-carrying catalyst, a metal catalyst is carried by a support. As a support, a support known in the art may be used. Examples thereof include, but are not limited to, carbon materials, such as carbon black, carbon nanotube, and carbon nanofiber, and carbon compounds, such as silicon carbide.

A metal catalyst carried by a support is not limited and a metal catalyst known in the art can be used, provided that the metal catalyst exerts catalytic activity in the reaction of MEA at the electrodes as described below.

The air electrode (the cathode): $O_2 + 4H^+ + 4e^- \rightarrow 2H_2O$

The fuel electrode (the anode): $2H_2 \rightarrow 4H^+ + 4e^-$

Examples of metal catalysts that can be used include, but are not limited to, platinum, platinum alloy, palladium, rhodium, gold, silver, osmium, and iridium. Furthermore, examples of platinum alloy that can be used include, but are not limited to, an alloy of platinum with at least one of aluminum, chromium, manganese, iron, cobalt, nickel, gallium, zirconium, molybdenum, ruthenium, rhodium, palladium, vanadium, tungsten, rhenium, osmium, iridium, titanium, and lead. As a catalyst metal, platinum may be used.

As an electrolyte, an ionomer may be used. An ionomer is also referred to as a cation-exchange resin and is present in the form of a cluster formed of ionomer molecules. As an ionomer, an ionomer known in the art can be used, and examples thereof that can be used include, but are not limited to, fluororesin-based electrolytes, such as a perfluorosulfonic acid resin material, sulfonated plastic-based electrolytes, such as sulfonated polyether ketone, sulfonated polyether sulfone, sulfonated polyether ether sulfone, sulfonated polysulfone, sulfonated polysulfide, and sulfonated polyphenylene, and sulfoalkylated plastic-based electrolytes, such as sulfoalkylated polyether ether ketone, sulfoalkylated polyether sulfone, sulfoalkylated polyether ether sulfone, sulfoalkylated polysulfone, sulfoalkylated polysulfide, and sulfoalkylated polyphenylene. As an ionomer, for example, a perfluorosulfonic acid resin material having hydrophobic teflon skeletons made of carbon and fluorine and sulfonic acid groups, which is a fluororesin-based electrolyte, such as Nafion (manufactured by DuPont), may be used.

As an electrolyte membrane, a proton-conductive electrolyte membrane may be used. As a proton-conductive electrolyte membrane, a proton-conductive electrolyte membrane known in the art can be used. Examples of proton-conductive electrolyte membranes that can be used include, but are not limited to, a membrane formed of a fluororesin containing sulfonic acid groups as described in the electrolyte (e.g., Nafion (manufactured by DuPont), Flemion (manufactured by Asahi Kasei Corporation), and Aciplex (manufactured by Asahi Kasei Corporation)) and a membrane formed of an inorganic substance, such as tungstic acid or phosphotungstic acid.

As a fuel gas diffusion layer or an oxidant gas diffusion layer, a conductive porous sheet may be used. As a conductive porous sheet, a conductive porous sheet known in the art can be used, and examples thereof include, but are not limited to, a sheet made of a gas-permeable or liquid-permeable material, such as a carbon cloth and a carbon paper.

As a separator, a conductive and gas-sealing material that can function as a current collector and a gas seal may be used. As a separator, a separator known in the art can be used, and examples thereof include, but are not limited to, a carbon separator composed of a composite material of a high-density carbon fiber with resin, such as a carbon cloth and a carbon paper, and a metal separator comprising a metal material. As a metal separator, a mesh or porous body made of a metal material that is excellent in anti-corrosion properties, including but are not limited to, platinum and gold, or a material whose surfaces are coated with carbon or a metal material that is excellent in anti-corrosion properties, so as to improve anti-corrosion properties, may be used. Such separator may be adequately subjected to compression molding or cutting, so that flow channels for reaction gas can be formed.

(A System for Implementing the Present Disclosure)

In an embodiment of a system for implementing the present disclosure, a system for aging a fuel cell comprises a fuel cell, a load application unit, a fuel supply unit, an oxidant supply unit, and a carbon monoxide supply unit. The system for aging a fuel cell optionally further comprises a nitrogen supply unit, a moisture supply unit, an air supply unit, a mixing unit for gases, a temperature measurement unit, a heat exchange unit, a pressure measurement unit, a dew-point measurement unit, and/or regulation units for such units.

In the present disclosure, a load application unit is connected to between a fuel electrode and an oxidant electrode so as to apply a potential cycle, wherein the lowest cell potential when a load is applied and OCV are alternately repeated between the fuel electrode and the oxidant electrode. As a load application unit, a load application unit known in the art can be used, and examples thereof that can be used include, but are not limited to, a resistance, such as a fixed resistance and a variable resistance (or an assembly of such resistances). Such load application unit is connected to between the fuel electrode and the oxidant electrode to periodically fluctuate the resistance level, so as to apply a potential cycle, wherein the lowest cell potential when a load is applied; i.e., the potential at the time of current sweeping, and OCV are alternately repeated.

A variable resistance may be, for example, an electronic load device. When an electronic load device is used, an electric load which periodically fluctuates can be more easily applied to a fuel cell. For example, a regulation unit for which a load pattern to be applied to a fuel cell has been determined in advance and an electronic load device connected thereto so that a load pattern signal can be transmitted from the regulation unit may be prepared, and the electronic load device is electrically connected to the fuel cell, and then, the predetermined load pattern may be implemented.

A regulation unit may be connected to, in addition to a load application unit, other units, such as a fuel supply unit, an oxidant supply unit, a carbon monoxide supply unit, a nitrogen supply unit, a moisture supply unit, an air supply unit, a temperature measurement unit, a heat exchange unit, a pressure measurement unit, and/or a dew-point measurement unit, so as to regulate such units.

A regulation unit may be constituted to observe arbitrary parameters, such as an output voltage and an output current of a fuel cell and flow rates of fuel gas, oxidant gas, carbon monoxide gas, nitrogen gas, hydrous gas, air, and so on, so that the regulation unit is capable of terminating application of a load in accordance with the parameter values, changing the flow rates of substances supplied, or implementing other load patterns. As long as a load application unit, wherein load patterns transmitted from a regulation unit can be applied, is used, similar effects to the electronic load device can be obtained even if the electronic load device is not used.

A fuel supply unit is connected to a fuel gas diffusion layer, and supplies fuel gas to a fuel electrode through the fuel gas diffusion layer. The fuel supply unit is capable of adjusting an amount of fuel supplied to the fuel electrode by regulating a pump or a blower and a valve. The amount of fuel supplied by the fuel supply unit may be regulated by a regulation unit.

An oxidant supply unit is connected to an oxidant gas diffusion layer, and supplies oxidant gas to an oxidant electrode through the oxidant gas diffusion layer. The oxidant supply unit is capable of adjusting an amount of oxidant gas supplied to the oxidant electrode by regulating a pump or a blower and a valve. The amount of oxidant gas supplied by the oxidant supply unit may be regulated by a regulation unit. When air is supplied as oxidant gas, the oxidant supply unit can be replaced with an air supply unit.

A carbon monoxide supply unit is connected to an oxidant gas diffusion layer, and supplies carbon monoxide gas to an oxidant electrode through the oxidant gas diffusion layer. The carbon monoxide supply unit is capable of adjusting an amount of carbon monoxide gas supplied to the oxidant electrode by regulating a pump or a blower and a valve. The amount of carbon monoxide gas supplied by the carbon monoxide supply unit may be regulated by a regulation unit.

A nitrogen supply unit is connected to an oxidant gas diffusion layer and/or a fuel gas diffusion layer, and supplies nitrogen gas to an oxidant electrode and/or a fuel electrode through the oxidant gas diffusion layer and/or the fuel gas diffusion layer. The nitrogen supply unit is capable of adjusting an amount of nitrogen gas supplied to the oxidant electrode and/or the fuel electrode by regulating a pump or a blower and a valve. The amount of nitrogen gas supplied by the nitrogen supply unit may be regulated by a regulation unit.

A moisture supply unit is connected to an oxidant gas diffusion layer and/or a fuel gas diffusion layer, and supplies hydrous gas (e.g., water vapor) to an oxidant electrode and/or a fuel electrode through the oxidant gas diffusion layer and/or the fuel gas diffusion layer. The moisture supply unit is capable of adjusting an amount of moisture supplied to the oxidant electrode and/or the fuel electrode by regulating a pump or a blower and a valve. The amount of moisture supplied by the moisture supply unit; i.e., humidity, may be regulated by a regulation unit.

An air supply unit is connected to an oxidant gas diffusion layer and/or a fuel gas diffusion layer, and supplies air to an oxidant electrode and/or a fuel electrode through the oxidant gas diffusion layer and/or the fuel gas diffusion layer. The air supply unit is capable of adjusting an amount of air supplied to the oxidant electrode and/or the fuel electrode by regulating a pump or a blower and a valve. The amount of air supplied by the air supply unit may be regulated by a regulation unit.

When two or more types of gases are supplied to an oxidant gas diffusion layer, a mixing unit may be installed in a region between respective supply units and the oxidant gas diffusion layer, so as to efficiently blend gases with each other. Similarly, when two or more types of gases are supplied to a fuel gas diffusion layer, a mixing unit may also be installed in a region between respective supply units and the fuel gas diffusion layer, so as to efficiently blend gases with each other. For example, when oxidant gas supplied by an oxidant supply unit and carbon monoxide gas supplied by a carbon monoxide supply unit are supplied to an oxidant gas diffusion layer, the oxidant supply unit and the carbon monoxide supply unit can be connected to a mixing unit, and the mixing unit can be connected to the oxidant gas diffusion layer. For example, when oxidant gas supplied by an oxidant supply unit, carbon monoxide gas supplied by a carbon monoxide supply unit, and nitrogen gas supplied by a nitrogen supply unit are supplied to an oxidant gas diffusion layer, the oxidant supply unit, the carbon monoxide supply unit, and the nitrogen supply unit can be connected to a mixing unit, and the mixing unit can be connected to the oxidant gas diffusion layer.

A temperature measurement unit, such as a temperature gauge, can be installed in a pipe in the vicinity of a cooling water outlet for a fuel cell, and a cell temperature of the fuel cell can be measured as a temperature of cooling water. A heat exchange unit, such as a heater or a cooler, can be installed in cooling water circulator of a fuel cell, so as to heat or cool the fuel cell. The temperature measurement unit and the heat exchange unit may be connected to a regulation unit to adjust a cell temperature.

Pressure measurement units are installed in front of and behind a pipe of each material supply unit and are capable of measuring pressure at the position installed. The Pressure measurement units may be connected to a regulation unit to adjust pressure.

A dew-point measurement unit is installed in the vicinity of a gas pipe to measure a dew point in gas. The dew-point measurement unit may be regulated by a regulation unit, and a gas temperature may be regulated in accordance with the dew point.

EMBODIMENTS OF THE PRESENT DISCLOSURE

According to an aging method of the present disclosure, a load application unit is connected to between a fuel electrode and an oxidant electrode, so as to apply a potential cycle, wherein the lowest cell potential when a load is applied and OCV (open circuit voltage) are alternately repeated, to a fuel cell and in the potential cycle, fuel gas is supplied to the fuel electrode, and oxidant gas and carbon monoxide gas are supplied to the oxidant electrode.

In the present disclosure, a single cycle in a potential cycle encompasses initiation of application of a load to between a fuel electrode and an oxidant electrode, termination of the application of the load, OCV, and restart of the application of the load. Accordingly, concerning a potential change of the single cycle in the potential cycle in the present disclosure, a cell potential begins to lower to the lowest cell potential when the load is applied between the fuel electrode and the oxidant electrode, the cell potential maintains the lowest cell potential for a given period of time, the cell potential begins to elevate to OCV; i.e., the highest cell potential by terminating the application of the load, and then the cell potential maintains OCV until the subsequent load is applied between the fuel electrode and the oxidant electrode.

In a potential cycle, a cell potential when a load is applied is a cell potential when a load is applied between a fuel electrode and an oxidant electrode. For example, a cell potential when a load is applied is a cell potential when a current is swept between a fuel electrode and an oxidant electrode.

In a potential cycle, a load is applied to adjust the lowest cell potential between a fuel electrode and an oxidant electrode to 0.4 V or lower, in general. For example, such load may be applied to adjust the lowest cell potential between a fuel electrode and an oxidant electrode to −0.1 V to 0.4 V and in some embodiments, −0.1 V to 0.2 V.

In a potential cycle, a sweep current when a load is applied is generally adjusted to 750 A or higher. For example, such sweep current when a load is applied may be adjusted to 750 A to 770 A and in some embodiments, 760 A to 765 A.

In a potential cycle, a period of application of a load (i.e., a period of current sweep) in a single cycle is a period, wherein a load is applied between a fuel electrode and an oxidant electrode; that is, a period of sweeping current between a fuel electrode and an oxidant electrode. Such period of application of a load in a single cycle is generally 50 seconds to 80 seconds. In some embodiments, such period of application of a load in a single cycle may be 70 seconds to 80 seconds.

In a potential cycle, by applying a load between a fuel electrode and an oxidant electrode, a potential between the fuel electrode and the oxidant electrode may be lowered, and carbon monoxide supplied to the oxidant electrode may be able to adhere to a catalyst without oxidation, and then desorption of a toxic substance may be accelerated as a consequence. More specifically, the adsorption force between carbon monoxide and the catalyst (e.g., a Pt catalyst) may become higher than the adsorption force between the toxic substance and the catalyst, and then substitution of the toxic substance with carbon monoxide may occur as a consequence. In addition, reduction of the toxic substance remaining adhered to the catalyst may be accelerated, and the toxic substance may be removed more easily. When the potential between the fuel electrode and the oxidant electrode is lowered, a positive surface potential of a Pt catalyst becomes a negative surface potential. Since the toxic substance have a negative surface potential, removal of the toxic substance is accelerated by the repulsive force between the negative surface potential of the Pt catalyst and the negative surface potential of the toxic substance. According to the present disclosure, therefore, an aging period can be shortened, and shipping inspection speed and production speed of a fuel cell can be accelerated as a consequence.

In a potential cycle, OCV (open circuit voltage) is a cell potential measured as a cell potential when no load is applied between a fuel electrode and an oxidant electrode; i.e., a cell potential between the fuel electrode and the oxidant electrode.

In a potential cycle, OCV is generally adjusted to 0.8 V or higher, for example 0.8 V to 0.9 V. In some embodiments, OCV may be adjusted to 0.8 V to 1.1 V. In other embodiments, OCV may be adjusted to 0.9 V to 1.1 V.

In a potential cycle, an OCV period in a single cycle; i.e., a period during which no load is applied between a fuel electrode and an oxidant electrode, is generally 5 seconds to 20 seconds. In some embodiments, such OCV period in a single cycle may be 5 seconds to 15 seconds.

In a potential cycle, an OCV potential value may be designated, so that a potential between a fuel electrode and an oxidant electrode may be high in OCV, carbon monoxide adsorbed to a catalyst at the oxidant electrode may be oxidized into carbon dioxide, and then, the carbon dioxide may be desorbed from the catalyst. In addition, oxidation of a toxic substance remaining adhered to the catalyst may be accelerated, and the toxic substance may be removed more easily. According to the present disclosure, therefore, an aging period can be shortened, and shipping inspection speed and production speed of a fuel cell can be accelerated as a consequence.

In a potential cycle, potential displacement speed from the lowest cell potential when a load is applied to OCV is generally 0.1 V/sec to 1.0 V/sec. For example, such potential displacement speed from the lowest cell potential when a load is applied to OCV may be 0.4 V/sec to 1.0 V/sec and in some embodiments, 0.5 V/sec to 1.0 V/sec.

In a potential cycle, the potential displacement speed from the lowest cell potential when a load is applied to OCV may be adjusted within the aforementioned range, so that an aging period can be shortened, and shipping inspection speed and production speed of a fuel cell can be accelerated as a consequence.

In a potential cycle, potential displacement speed from OCV to the lowest cell potential when a load is applied is generally 0.1 V/sec to 1.0 V/sec. For example, such potential displacement speed from OCV to the lowest cell potential when a load is applied may be 0.4 V/sec to 1.0 V/sec and in some embodiments, 0.5 V/sec to 1.0 V/sec.

In a potential cycle, the potential displacement speed from OCV to the lowest cell potential when a load is applied may be adjusted within the aforementioned range, so that an aging period can be shortened, and shipping inspection speed and production speed of a fuel cell can be accelerated as a consequence.

In a potential cycle according to the present disclosure, a period of a single cycle is generally 90 seconds to 120 seconds. For example, such period of a single cycle may be 100 seconds to 120 seconds and in some embodiments, 90 seconds to 100 seconds.

In the present disclosure, the number of cycling in a potential cycle is generally 10 to 15. In some embodiments, such number of cycling in a potential cycle may be 10 to 12.

Accordingly, the total period of the potential cycle is generally 15 minutes to 30 minutes. In some embodiments, such total period of the potential cycle may be 15 minutes to 20 minutes.

Even when the number of cycling and the period of cycling in the potential cycle are adjusted within the aforementioned range, a toxic substance remaining adhered to a catalyst can be efficiently removed by the effects of carbon monoxide gas according to the present disclosure. Therefore, according to the present disclosure, the number of cycling and the period of cycling in the potential cycle in an aging method can be decreased, and shipping inspection speed and production speed of a fuel cell can be accelerated as a consequence.

In a potential cycle according to the present disclosure, a waveform of the potential cycle is not particularly limited. Examples of waveforms of the potential cycle include rectangular waves, triangular waves, and sine waves.

In a potential cycle according to the present disclosure, a cell temperature of a fuel cell is generally adjusted to 70° C. to 90° C. by, for example, a heat exchange unit. In some embodiments, such cell temperature of a fuel cell may be adjusted to 80° C. to 85° C. by, for example, a heat exchange unit.

In the potential cycle according to the present disclosure, the cell temperature of the fuel cell may be adjusted within the aforementioned range, so that carbon monoxide supplied to an oxidant electrode can adsorb to a catalyst more efficiently, and desorption of a toxic substance can be accelerated. According to the present disclosure, therefore, an aging period can be shortened, and shipping inspection speed and production speed of a fuel cell can be accelerated as a consequence.

In a potential cycle according to the present disclosure, fuel gas, such as hydrogen gas, is supplied to a fuel electrode by a fuel supply unit. Optionally, nitrogen gas, hydrous gas, and/or air may further be supplied to the fuel electrode by a nitrogen supply unit, a moisture supply unit, and/or an air supply unit, respectively.

In the case of a fuel cell, wherein 330 cells with the power-generating area of 273 $cm^2$ per cell are fastened in series, an amount of fuel supplied to a fuel electrode by a fuel supply unit is generally 1800 l/min to 2200 l/min. In some embodiments, such amount of fuel supplied to a fuel electrode by a fuel supply unit may be 2000 l/min to 2200 l/min. When gas other than fuel gas, such as hydrous gas, is supplied to a fuel electrode, a concentration of fuel supplied to the fuel electrode by a fuel supply unit is generally 93 vol % to 96 vol % based on the volume of the entire gas supplied to the fuel electrode. In some embodiments, such concentration of fuel supplied to the fuel electrode by a fuel supply unit may be 94 vol % to 95 vol % based on the volume of the entire gas supplied to the fuel electrode.

In the case of a fuel cell, wherein 330 cells with the power-generating area of 273 cm$^2$ per cell are fastened in series, an amount of hydrous gas supplied to a fuel electrode by a moisture supply unit is generally 80 l/min to 120 l/min. In some embodiments, such amount of hydrous gas supplied to a fuel electrode by a moisture supply unit may be 100 l/min to 120 l/min. A concentration of hydrous gas supplied to a fuel electrode by a moisture supply unit is generally 4 vol % to 6 vol % based on the volume of the entire gas supplied to the fuel electrode. In some embodiments, such concentration of hydrous gas supplied to a fuel electrode by a moisture supply unit may be 5 vol % to 6 vol % based on the volume of the entire gas supplied to the fuel electrode. An amount (concentration) of hydrous gas supplied to a fuel electrode by a moisture supply unit is generally adjusted in a manner such that the relative humidity of the entire gas supplied to the fuel electrode is 60% RH to 100% RH. In some embodiments, such amount (concentration) of hydrous gas supplied to a fuel electrode by a moisture supply unit may be adjusted in a manner such that the relative humidity of the entire gas supplied to the fuel electrode is 80% RH to 100% RH.

An amount of nitrogen gas supplied to a fuel electrode by a nitrogen supply unit is not limited. Nitrogen gas may not be supplied to a fuel electrode.

An amount of air supplied to a fuel electrode by an air supply unit is not limited. Air may not be supplied to a fuel electrode.

In the case of a fuel cell, wherein 330 cells with the power-generating area of 273 cm$^2$ per cell are fastened in series, an amount of the entire gas supplied to a fuel electrode is generally 1880 l/min to 2320 l/min when gas other than fuel gas, such as hydrous gas, is supplied to the fuel electrode. In some embodiments, such amount of the entire gas supplied to a fuel electrode may be 2100 l/min to 2320 l/min.

By supplying the gases to the fuel electrode in the amount described above, the electrolyte membrane can be efficiently moistened, and power generation efficiency can be enhanced.

In a potential cycle according to the present disclosure, oxidant gas, such as air and/or oxygen gas (air, in general), is supplied to an oxidant electrode by an oxidant supply unit, and carbon monoxide gas is supplied to the oxidant electrode by a carbon monoxide supply unit. Optionally, nitrogen gas, hydrous gas, and/or air separately from oxidant gas may be supplied to the oxidant electrode by a nitrogen supply unit, a moisture supply unit, and/or an air supply unit, respectively. When air is used as an oxidant, an air supply unit can be used as an oxidant supply unit.

In the case of a fuel cell, wherein 330 cells with the power-generating area of 273 cm$^2$ per cell are fastened in series, an amount of oxidant gas supplied to an oxidant electrode by an oxidant supply unit is generally 4500 l/min to 6000 l/min when air is used as an oxidant (i.e., when an air supply unit is used as the oxidant supply unit). In some embodiments, such amount of oxidant gas supplied to an oxidant electrode by an oxidant supply unit may be 4500 l/min to 5000 l/min. When gas other than air and carbon monoxide gas, such as hydrous gas and/or nitrogen gas, are supplied to an oxidant electrode, a concentration of air supplied to the oxidant electrode by an air supply unit is generally 60 vol % to 73 vol % based on the volume of the entire gas supplied to the oxidant electrode. In some embodiments, such concentration of air supplied to the oxidant electrode by an air supply unit may be 61 vol % to 65 vol % based on the volume of the entire gas supplied to the oxidant electrode. An amount (concentration) of air supplied to an oxidant electrode by an air supply unit is generally adjusted in a manner such that a ratio of an amount of fuel supplied to a fuel electrode to the theoretically necessary amount of oxygen to allow the aforementioned amount of fuel to completely react (oxygen level/fuel level ratio, also referred to as the "stoichiometric ratio") is 1.15 to 1.30. In some embodiments, such amount (concentration) of air supplied to an oxidant electrode by an air supply unit may be adjusted in a manner such that a ratio of an amount of fuel supplied to a fuel electrode to the theoretically necessary amount of oxygen to allow the aforementioned amount of fuel to completely react is 1.15 to 1.20.

In the case of a fuel cell, wherein 330 cells with the power-generating area of 273 cm$^2$ per cell are fastened in series, an amount of carbon monoxide gas supplied to an oxidant electrode by a carbon monoxide supply unit is generally 100 l/min to 300 l/min. In some embodiments, such amount of carbon monoxide gas supplied to an oxidant electrode by a carbon monoxide supply unit may be 200 l/min to 300 l/min. When gas other than oxidant gas (air) and carbon monoxide gas, such as hydrous gas and/or nitrogen gas, are supplied to an oxidant electrode, a concentration of carbon monoxide gas supplied to the oxidant electrode by a carbon monoxide supply unit is generally 2 vol % to 4 vol % based on the volume of the entire gas supplied to the oxidant electrode. For example, such concentration of carbon monoxide gas supplied to the oxidant electrode by a carbon monoxide supply unit may be 2 vol % to 3 vol % based on the volume of the entire gas supplied to the oxidant electrode. In some embodiments, such concentration of carbon monoxide gas supplied to the oxidant electrode by a carbon monoxide supply unit may be 3 vol % to 4 vol % based on the volume of the entire gas supplied to the oxidant electrode.

In the case of a fuel cell, wherein 330 cells with the power-generating area of 273 cm$^2$ per cell are fastened in series, an amount of nitrogen gas supplied to an oxidant electrode by a nitrogen supply unit is generally 200 l/min to 800 l/min. In some embodiments, such amount of nitrogen gas supplied to an oxidant electrode by a nitrogen supply unit may be 600 l/min to 800 l/min. A concentration of nitrogen gas supplied to an oxidant electrode by a nitrogen supply unit is generally 3 vol % to 9 vol % based on the volume of the entire gas supplied to the oxidant electrode. In some embodiments, such concentration of nitrogen gas supplied to an oxidant electrode by a nitrogen supply unit may be 8 vol % to 9 vol % based on the volume of the entire gas supplied to the oxidant electrode.

In the case of a fuel cell, wherein 330 cells with the power-generating area of 273 cm$^2$ per cell are fastened in series, an amount of hydrous gas supplied to an oxidant electrode by a moisture supply unit is generally 1800 l/min to 2000 l/min. In some embodiments, such amount of hydrous gas supplied to an oxidant electrode by a moisture supply unit may be 1900 l/min to 2000 l/min. A concentration of hydrous gas supplied to an oxidant electrode by a moisture supply unit is generally 22 vol % to 27 vol % based on the volume of the entire gas supplied to the oxidant electrode. In some embodiments, such concentration of hydrous gas supplied to an oxidant electrode by a moisture supply unit may be 24 vol % to 26 vol % based on the volume of the entire gas supplied to the oxidant electrode. An amount (concentration) of hydrous gas supplied to an oxidant electrode by a moisture supply unit is generally adjusted in a manner such that the relative humidity of the entire gas supplied to the oxidant electrode is 60% RH to 100% RH. In some embodiments, such amount (concentration) of hydrous gas supplied to an oxidant electrode by a moisture supply unit may be adjusted in a manner such that the relative humidity of the entire gas supplied to the oxidant electrode is 80% RH to 100% RH.

In the case of a fuel cell, wherein 330 cells with the power-generating area of 273 $cm^2$ per cell are fastened in series, an amount of the entire gas supplied to an oxidant electrode is generally 6600 l/min to 9100 l/min when air is used as oxidant gas (i.e., when an air supply unit is used as an oxidant supply unit) and gas other than air and carbon monoxide gas, such as hydrous gas and/or nitrogen gas, are supplied to the oxidant electrode. In some embodiments, such amount of the entire gas supplied to an oxidant electrode may be 7200 l/min to 8100 l/min.

By supplying the gases to the oxidant electrode in the amount described above, the electrolyte membrane can be moistened, and the potential thereof can be lowered, and a toxic substance can be thus removed.

In a potential cycle according to the present disclosure, oxidant gas and carbon monoxide gas may be supplied to an oxidant electrode when a load is applied in the potential cycle, and oxidant gas may be supplied to the oxidant electrode when the application of the load is terminated in the potential cycle. In a potential cycle according to the present disclosure, in other words, carbon monoxide gas may be supplied to an oxidant electrode by a carbon monoxide supply unit when a load is applied, and carbon monoxide gas may not be supplied when the application of the load is terminated, in particular, at OCV.

In a potential cycle according to the present disclosure, carbon monoxide gas is supplied to an oxidant electrode when a load is applied; i.e., when a potential between a fuel electrode and the oxidant electrode is low. Thus, carbon monoxide can efficiently adsorb to a catalyst without oxidizing carbon monoxide, and desorption of a toxic substance can be accelerated. In addition, carbon monoxide gas may not be supplied to the oxidant electrode at OCV; i.e., when the potential between the fuel electrode and the oxidant electrode is high. Thus, the adsorbed carbon monoxide can be efficiently oxidized into carbon dioxide and then, the carbon dioxide can be desorbed from the catalyst.

In a potential cycle according to the present disclosure, fuel gas is supplied to a fuel electrode, and an oxidant and carbon monoxide are supplied to an oxidant electrode. Thus, carbon monoxide can adsorb to a catalyst while generating power, and desorption of a toxic substance can be accelerated. According to the present disclosure, therefore, an aging period can be shortened, and shipping inspection speed and production speed of a fuel cell can be accelerated as a consequence.

Figure 3:
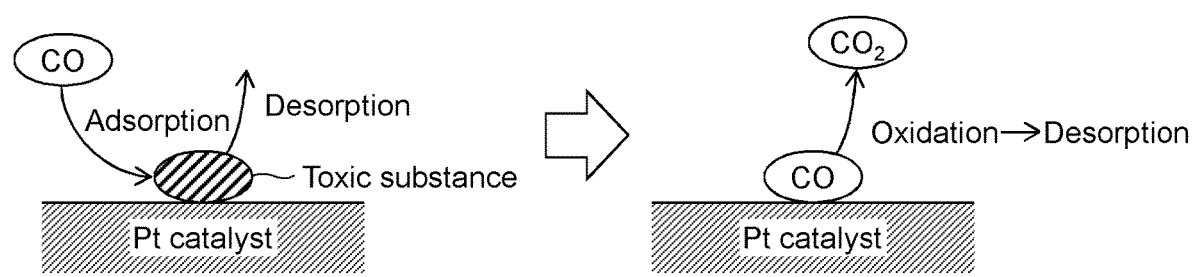
FIG. 3 schematically shows an embodiment of the present disclosure, in which a toxic substance is desorbed from a platinum (Pt) catalyst.

FIG. 3 schematically shows an embodiment of the present disclosure, in which a toxic substance is desorbed from a platinum (Pt) catalyst. In FIG. 3, fuel gas is supplied to a fuel electrode and oxidant gas is supplied to an oxidant electrode. In that state, the process (1) and the process (2) described below are repeated as a single cycle, so as to efficiently remove the toxic substance adsorbed to the Pt catalyst. Thus, an aging period of a fuel cell can be shortened.

(1) When a load is applied; i.e., at a low potential, carbon monoxide (CO) gas is further supplied to the oxidant electrode. At an optimal adsorption temperature for CO gas (e.g., 80° C.), CO gas efficiently adsorbs to the Pt catalyst without being oxidized. As a result of adsorption of CO gas to the Pt catalyst, the toxic substance adsorbed to the Pt catalyst is desorbed. Under the condition in (1), the adsorption force between CO gas and the Pt catalyst may become higher than the adsorption force between the toxic substance and the Pt catalyst, and the toxic substance may be thus substituted with CO gas.

(2) Application of the load is terminated to elevate a potential level. As the potential is elevated, CO adsorbed to the Pt catalyst is oxidized into carbon dioxide ($CO_2$) and then, the carbon dioxide is desorbed from the Pt catalyst.

The technique of present disclosure can be implemented either before or after fuel cell shipping. In addition, the technique of the present disclosure can be applied to regeneration of a fuel cell suffering from adsorption of toxic substances thereto and lowered performance as a result of use. Fuel cell performance can be restored by an aging method according to the present disclosure.

[Examples]

Hereafter, examples of the present disclosure are described, although the technical scope of the present disclosure is not limited to these examples.

I. Treatment of Fuel Cell with Carbon Monoxide

As a model experiment, a membrane-electrode assembly (MEA) of a polymer electrolyte fuel cell using a Pt catalyst was first soaked in warm water (70° C.) saturated with carbon monoxide.

MEA treated with carbon monoxide (MEA with CO treatment) in the manner described above and MEA that was not treated with carbon monoxide (MEA without CO treatment) were each mounted on a small single unit cell (electrode area: 1 $cm^2$). Then, hydrogen and air were supplied to a fuel electrode and an oxidant electrode, respectively, at the stoichiometric ratio of 10 or higher, at cell temperature of 65° C., at relative humidity of 30% for humidified gas to generate power.

Figure 4:
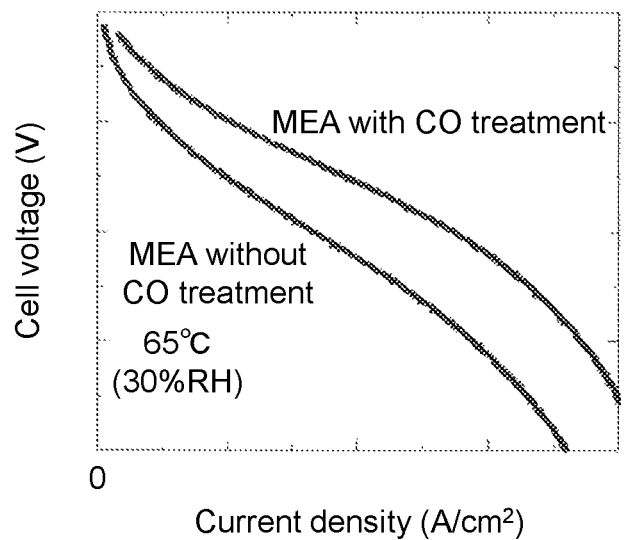
FIG. 4 shows a correlation between current density and a cell voltage of a polymer electrolyte fuel cell subjected to carbon monoxide (CO) treatment (i.e., a polymer electrolyte fuel cell with CO treatment) and a polymer electrolyte fuel cell not subjected to CO treatment (i.e., a polymer electrolyte fuel cell without CO treatment).

FIG. 4 shows a correlation between current density and a cell voltage of a polymer electrolyte fuel cell subjected to carbon monoxide (CO) treatment (i.e., a polymer electrolyte fuel cell with CO treatment) and a polymer electrolyte fuel cell not subjected to CO treatment (i.e., a polymer electrolyte fuel cell without CO treatment). FIG. 4 demonstrates that performance of a polymer electrolyte fuel cell can be improved by subjecting the polymer electrolyte fuel cell to CO treatment.

II. Aging Method of Fuel Cell

A polymer electrolyte fuel cell was subjected to aging at cell temperature of 80° C. under the conditions shown in Table 1. The aging period includes the test operation period before carbon monoxide gas was supplied.

TABLE 1

|  | Conventional conditions | Examples |
| --- | --- | --- |
| Sweep current | 764 A | 764 A |
| Air stoichiometric ratio | 1.15 | 1.15 |
| Amount of $N_2$ blended | 800 l/min | 800 l/min |
| Amount of CO blended | 0 l/min | 200 l/min |
| Current sweep period | 76 sec | 76 sec |
| OCV period | 15 sec | 15 sec |
| Number of cycling | 18 | 12 |
| Aging period | 40 min | 30 min |

Figure 5:
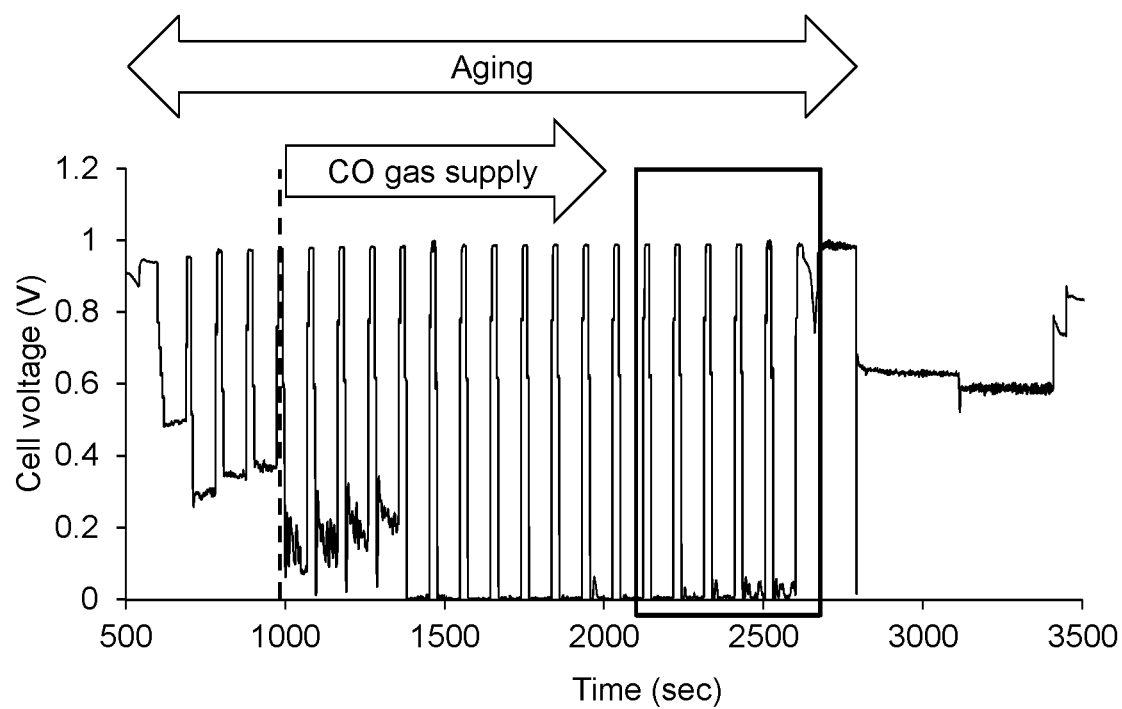
FIG. 5 shows a correlation between an aging period and a cell voltage when carbon monoxide (CO) gas is supplied to an oxidant electrode in a step of aging and a step of cell power generation inspection of a fuel cell.
Figure 6:
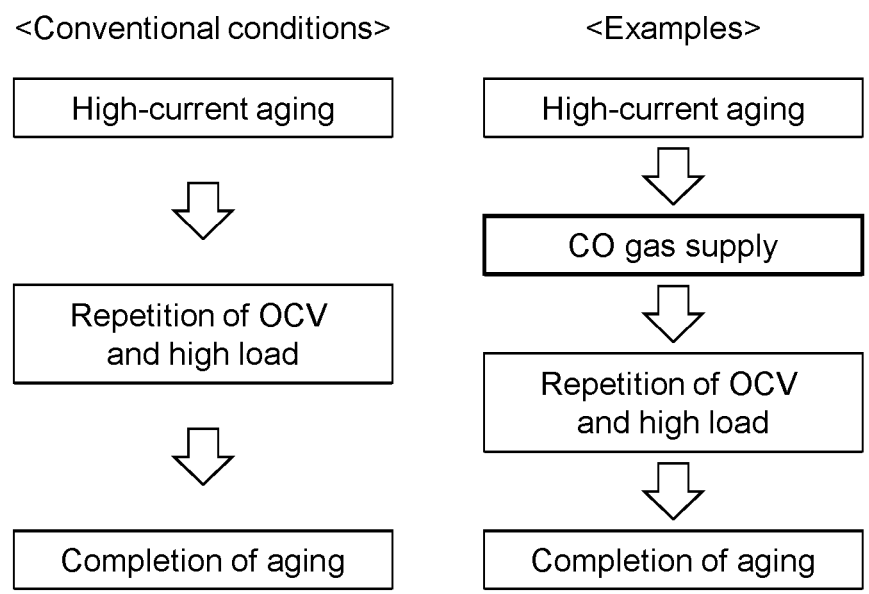
FIG. 6 shows a comparison of conventional aging conditions for a polymer electrolyte fuel cell and aging conditions for a polymer electrolyte fuel cell employed in the examples.

FIG. 5 shows a correlation between an aging period and a cell voltage when carbon monoxide (CO) gas is supplied to an oxidant electrode in a step of aging and a step of cell power generation inspection of the fuel cell. FIG. 6 shows a comparison of conventional aging conditions for polymer electrolyte fuel cells and aging conditions for polymer electrolyte fuel cells employed in the examples.

FIG. 5 and FIG. 6 demonstrate that the cycles surrounded by a rectangle can be shortened by CO supply in a potential cycle of the aging method under the conditions employed in the examples.

Whether or not aging had been successfully performed or failed was determined based on the voltage (high or low) at the time of fuel cell inspection.

By supplying oxidant gas and carbon monoxide gas to the oxidant electrode, the aging period was shortened.

All publications, patents and patent applications cited in the present description are herein incorporated by reference as they are.

What is claimed is:

1. An aging method of a fuel cell which comprises a membrane electrode assembly comprising a fuel electrode, an electrolyte membrane, and an oxidant electrode, wherein
   the method comprises applying a potential cycle, wherein the lowest cell potential when a load is applied and OCV [open circuit voltage] are alternately repeated between the fuel electrode and the oxidant electrode, and
   in the potential cycle,
   fuel gas is supplied to the fuel electrode and
   oxidant gas and carbon monoxide gas are supplied to the oxidant electrode.

2. The method according to claim 1, wherein oxidant gas and carbon monoxide gas are supplied to the oxidant electrode when the load is applied in the potential cycle and oxidant gas is supplied to the oxidant electrode when the application of the load is terminated in the potential cycle.

3. The method according to claim 2, wherein nitrogen gas is further supplied to the oxidant electrode, a cell temperature of the fuel cell is 70° C. to 90° C., the lowest cell potential when the load is applied is −0.1 V to 0.4 V, OCV is 0.8 V to 1.1 V, and potential displacement speed from the lowest cell potential when the load is applied to OCV and potential displacement speed from OCV to the lowest cell potential when the load is applied are each 0.4 V/sec to 1.0 V/sec.

4. The method according to claim 3, wherein carbon monoxide gas is supplied in an amount of 2 vol % to 4 vol % relative to volume of entire gas supplied to the oxidant electrode.

5. The method according to claim 2, wherein carbon monoxide gas is supplied in an amount of 2 vol % to 4 vol % relative to volume of entire gas supplied to the oxidant electrode.

6. The method according to claim 1, wherein nitrogen gas is further supplied to the oxidant electrode, a cell temperature of the fuel cell is 70° C. to 90° C., the lowest cell potential when the load is applied is −0.1 V to 0.4 V, OCV is 0.8 V to 1.1 V, and potential displacement speed from the lowest cell potential when the load is applied to OCV and potential displacement speed from OCV to the lowest cell potential when the load is applied are each 0.4 V/sec to 1.0 V/sec.

7. The method according to claim 6, wherein carbon monoxide gas is supplied in an amount of 2 vol % to 4 vol % relative to volume of entire gas supplied to the oxidant electrode.

8. The method according to claim 1, wherein carbon monoxide gas is supplied in an amount of 2 vol % to 4 vol % relative to volume of entire gas supplied to the oxidant electrode.

* * * * *